United States Patent
Jyrkka et al.

(12) 
(10) Patent No.: US 6,587,695 B1
(45) Date of Patent: Jul. 1, 2003

(54) METHOD AND APPARATUS FOR DISTINGUISHING A COMPACT CONTROL CHANNEL FROM A CLASSIC CONTROL CHANNEL

(75) Inventors: Kari Jyrkka, Oulu (FI); Harri Jokinen, Lliisi (FI)

(73) Assignee: Nokia Mobile Phones Limited, Espoo (FI)

( * ) Notice: Subject to any disclaimer, the term of this patent is extended or adjusted under 35 U.S.C. 154(b) by 422 days.

(21) Appl. No.: 09/669,508

(22) Filed: Sep. 25, 2000

Related U.S. Application Data

(60) Provisional application No. 60/161,892, filed on Oct. 27, 1999.

(51) Int. Cl.[7] .............................. H04B 7/00; H04B 7/20; H04Q 7/20
(52) U.S. Cl. ...................... 455/515; 455/516; 375/364; 375/366
(58) Field of Search ................................. 455/552, 516, 455/447, 560, 562, 455, 575; 375/341, 354, 340, 344, 326, 260, 296, 224, 362, 316, 322, 297

(56) References Cited

U.S. PATENT DOCUMENTS

| | | | |
|---|---|---|---|
| 5,341,401 A | | 8/1994 | Farjh et al. .................. 375/94 |
| 5,390,216 A | | 2/1995 | Bilitza et al. ................ 375/106 |
| 5,770,927 A | | 6/1998 | Abe ............................ 375/340 |
| 5,828,705 A | * | 10/1998 | Kroeger et al. ............. 375/326 |
| 6,104,767 A | * | 8/2000 | Atarius et al. .............. 375/344 |
| 6,108,385 A | * | 8/2000 | Worley, III ................. 375/296 |
| 6,175,737 B1 | * | 1/2001 | Kao ............................. 455/447 |
| 6,389,089 B1 | * | 5/2002 | Hartmann et al. .......... 375/364 |

FOREIGN PATENT DOCUMENTS

| | | |
|---|---|---|
| DE | 197 48 030 A1 | 4/1999 |
| EP | 0 522 885 A2 | 1/1993 |

OTHER PUBLICATIONS

"TDMA Based Packet Data System Standard and Deployment" Pirhonen et al., Nokia Research Center, pps. 743–747, 1999.

* cited by examiner

*Primary Examiner*—Thanh Cong Le
*Assistant Examiner*—Andrew T Harry
(74) *Attorney, Agent, or Firm*—Harrington & Smith, LLP

(57) ABSTRACT

A method is disclosed to distinguish a first type of control channel from a second type of control channel. The method includes steps of (a) transmitting a carrier of the first type of control channel so as to include a first symbol sequence that results, when demodulated, in a sine wave having a frequency with a first offset from the carrier; (b) transmitting a carrier of the second type of control channel so as to include a second symbol sequence that results, when demodulated, in a sine wave having a frequency with a second offset from the carrier; and (c) demodulating a received carrier and detecting whether the carrier includes the first type of control channel of the second type of control channel. In the preferred embodiment of this invention the first symbol sequence is an all zeroes sequence, and the second type of symbol sequence is an alternating ones and zeroes sequence, which results in the first offset being a positive offset, and the second offset being a negative offset. In a most preferred embodiment the first offset is +67.7 kHz, and the second offset is −67.7 kHz. The step of demodulating includes a step of multiplying an I/Q representation of the received symbol sequence by 1−j, −1 j, 1−j, . . . , and by 1 j, −1−j, 1 j, . . .

17 Claims, 3 Drawing Sheets

METHOD AND APPARATUS FOR DISTINGUISHING A COMPACT CONTROL CHANNEL FROM A CLASSIC CONTROL CHANNEL

CLAIM OF PRIORITY FROM A COPENDING PROVISIONAL PATENT APPLICATION

Priority is herewith claimed under 35 U.S.C. §119(e) from copending Provisional Patent Application No. 60/161,892, filed Oct. 27, 1999, entitled "METHOD AND APPARATUS FOR DISTINGUISHING A COMPACT CONTROL CHANNEL FROM A CLASSIC CONTROL CHANNEL", by Kari Jyrkkä and Harri Jokinen. The disclosure of this Provisional Patent Application is incorporated by reference herein in its entirety.

FIELD OF THE INVENTION

This invention relates generally to wireless communications systems employing digital control and traffic channels and, more particularly to digital wireless communications systems capable of transmitting packet data.

BACKGROUND OF THE INVENTION

An Enhanced Global Packet Radio System (EGRPS) Compact control channel solution introduces a discontinuously transmitting rotating control channel. This control channel solution makes it possible to deploy a GSM system with less than a one MHz bandwidth in a synchronous network. The Compact control channel solution proposals were adopted at UWCC.GTF.PDFG/RF-group meeting May 13–15, 1999 in Monterey (UWCC.GTF.PDFG/99.04.13.38, 3-Carrier Compact Proposal). The Compact control channel solution is a proposal for a TDMA, 136HS network that maintains a spectrum deployment below one MHz.

A general goal of the Compact solution is to use three carriers (600 kHz) in a ⅓ reuse manner, but to achieve a nine or twelve reuse factor for control channels by using a 200 kHz synchronous network. This 3-Carrier Compact Solution was presented to ETSI at the Paris EDGE SMG workshop (Tdoc SMG2 EDGE 122/99, Tdoc SMG2 EDGE 152/99, Tdoc SMG2 EDGE 153/99), incorporated by reference herein.

The Compact control channel does not use the conventional GSM 51-multiframe for control since the 51-multiframe includes all of the circuit switched broadcast support. Instead, what was selected was a packet control channel (Packet Broadcast Control Channel plus Packet Common Control Channel (PBCCH+PCCCH)) on a 52-multiframe basis. The existing 52-multiframe PBCCH control channel structure was modified to support as well a frequency correction and synchronization feature for mobile stations. One frequency correction burst (PFCCH) was added to the 26th frame, and one synchronization burst (PSCH) was added to the 52nd frame.

The inventors have realized that the 3-Carrier Compact Solution, as presently proposed, has several inherent problems.

First, since exactly the same frequency correction and synchronization bursts are used, as with current GSM 51-multiframe, a mobile station cannot differentiate the Compact 52-multiframe control channels from the conventional (or classic) GSM 51-multiframe control channels. As a result, there is potential that the operation of conventional mobile stations, which "understand" only the 51-multiframe control channel, will be disturbed by the new 52-multiframe compact control channel. This is possible since the mobile station searches for frequency correction bursts during its initial synchronization, and a conventional mobile station may locate and lock to a Compact control channel (which it is not compatible with). Even if the mobile station were not to lock to the Compact control channel, it can be expected that the cell selection procedure of the conventional mobile stations will become slower.

A second problem is that the initial cell selection procedure becomes challenging as well for "new" mobile stations (i.e., those compatible with the 3-Carrier Compact Solution), since these mobile stations should be able to synchronize either to the conventional continuously transmitting 51-multiframe control channel or to the discontinuously transmitting 52-multiframe control channel. The mobile station begins the initial cell selection process by measuring the received signal level from each carrier of the band.

Since the Compact control channel is discontinuously transmitting, the mobile station must measure each channel long enough to insure that it receives at least one occurrence of the Compact control channel transmission. Due to the discontinuous nature of the transmission, the scanning time can increase from about five seconds to as much as about two minutes. After the scanning procedure the mobile station lists the channels of the band according to received signal level, and then attempts to synchronize with the control channels, starting at the top of the list (i.e., with the control channel having the greatest signal level). The most problematic case is when the mobile station attempts to synchronize as a first priority to a particular network which uses only compact control carriers, as the continuous control carriers from another network or networks will most probably dominate the control channel list after the received signal level scan.

In the conventional approach a Pure Sine Wave (PSW) search is used during the initial synchronization for adjusting the mobile station's local oscillator frequency and to find a coarse synchronization channel (SCH) burst position, since a real time SCH burst search was not possible with existing hardware. The PSW is also a "light" algorithm in so far as the DSP is concerned.

When the conventional mobile station finds the PFCCH burst from the proposed Compact carrier, which is identical to the GSM FCH burst, the mobile station may remain tuned to that carrier for a long period of time. Since the mobile station does not find the SCH burst in the expected location, after assuming that it has located the FCH burst, it may determine that its frequency offset is not correct, and therefore a new FCH burst adjustment can be made. This problem can exist as well with the stored PLMN list search. For example, the mobile station may be switched off at one location, and then switched back on at another location. The stored last camped control channel and neighbor channel list information can be misleading at the second location, if a different network operator has placed the Compact control channel system side-by-side with the mobile station's operator's conventional (classical) control channel system.

In an attempt to solve the initial cell selection time problem, it has been proposed to introduce a different PSCH training sequence for the Compact control channel. However, this proposed solution has the drawback that it does not solve the problem related to the incompatibility issue with conventional mobile stations. In addition, the use of the proposed PSCH training sequence information requires much more Digital Signal Processor (DSP) processing power in the mobile station, as the mobile station must be able to simultaneously search the PFCCH and PSCH bursts. Furthermore, if the mobile station local oscillator exhibits a significant error during the period of initial cell selection, the PSCH search may not work at all.

OBJECTS AND ADVANTAGES OF THE INVENTION

It is a first object and advantage of this invention to provide a technique that is able to reduce an initial cell selection time.

It is another object and advantage of this invention to provide a technique to distinguish a continuously transmitted 51-multiframe control channel from a discontinuously transmitted 52-multiframe control channel, particularly one that employs Compact control channels.

SUMMARY OF THE INVENTION

The foregoing and other problems are overcome and the objects of the invention are realized by methods and apparatus in accordance with embodiments of this invention.

The foregoing and other problems are solved, in accordance with the teachings of this invention, by the introduction of an improved frequency correction burst in the 52-multiframe control channel. Instead of using exactly the same frequency correction format as with the conventional 51-multiframe approach, the format of the frequency correction burst is modified to make it distinguishable from the conventional 51-multiframe frequency correction burst.

More particularly, the 51-multiframe frequency correction burst is transmitted as all zeroes 0000 . . . which yields a 67.7 kHz pure sine wave (PSW) signal above the carrier frequency. In accordance with the teachings of this invention, a 1010 . . . bit pattern is used instead for the 52-multiframe control channel, which yields a pure sine wave (PSW) signal 67.7 kHz beneath or under the carrier frequency. Using this frequency correction format, the operation of conventional mobile stations is not interfered with, while new mobile stations are enabled to distinguish the conventional control channel from the Compact control channel. As a result, the initial cell selection process is enhanced and is executed in a reduced amount of time.

During the scan procedure the mobile station is able to distinguish the control channels as follows.

(A) If the received signal strength level (RX-level) is high (above some predetermined receive threshold), but neither the 67.7 kHz sine or the −67.7 kHz sine are found, then the current channel may be a traffic channel or some non-GSM channel.

(B) If the RX-level is high, and the 67.7 kHz sine is found, then the current channel is a conventional 51-multiframe continuous GSM control channel.

(C) If the RX-level is high, and the −67.7 kHz sine is found, then the current channel is a 52-multiframe discontinuous Compact control channel.

The mobile station is then enabled to use this information when attempting to synchronize to a most preferred Public Land Mobile Network (PLMN). The PLMN list is stored in the mobile station, such as in the Subscriber Identity Module (SIM), and provides information about control channel usage. For example, the first priority PLMN may use only compact control channels. In this case the mobile station is enabled to begin its synchronization search with those channels which were listed as being possible Compact control channels.

A method is thus provided to distinguish a first type of control channel from a second type of control channel. The method includes steps of (a) transmitting a carrier of the first type of control channel so as to include a first symbol sequence that results, when demodulated, in a sine wave having a frequency with a first offset from the carrier; (b) transmitting a carrier of the second type of control channel so as to include a second symbol sequence that results, when demodulated, in a sine wave having a frequency with a second offset from the carrier; and (c) demodulating a received carrier and detecting whether the carrier includes the first type of control channel of the second type of control channel.

In the preferred embodiment of this invention the first symbol sequence is an all zeroes sequence, and the second type of symbol sequence is an alternating ones and zeroes sequence, which results in the first offset being a positive offset, and the second offset being a negative offset. In a most preferred embodiment the first offset is +67.7 kHz, and the second offset is −67.7 kHz.

The step of demodulating includes a step of multiplying an I/Q representation of the received symbol sequence by 1−j, −1 j, 1−j, . . . , and by 1 j, −1−j, 1 j, . . .

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
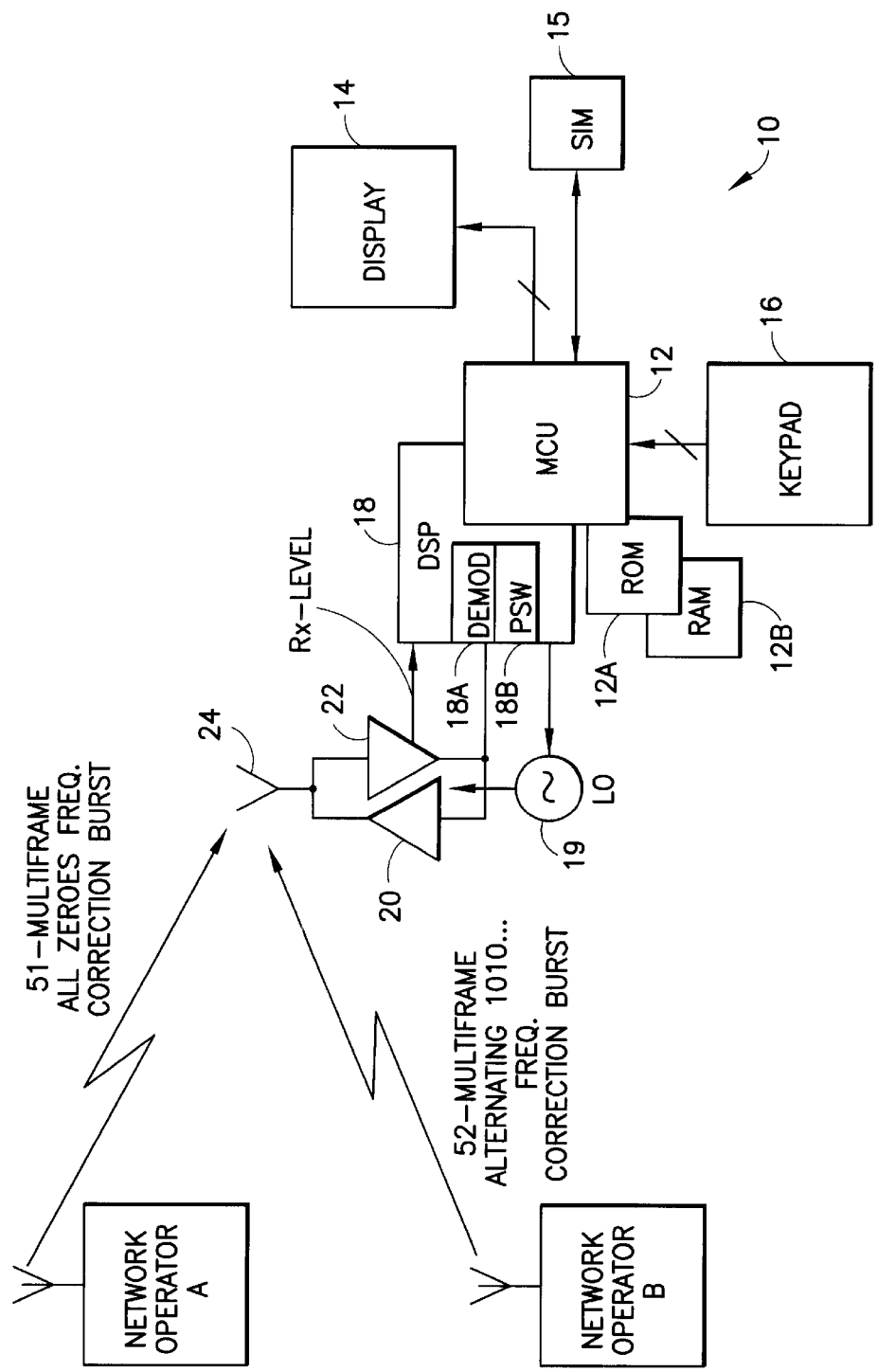
FIG. 1 is a block diagram of a wireless telecommunications network that operates in accordance with the teachings of this invention.

Referring to FIG. 1, there is illustrated a simplified block diagram of an embodiment of a mobile station 10 that is suitable for practicing this invention. The Figure also shows a plurality of network operators A and B, wherein for the purposes of this discussion it is assumed that network operator A transmits a conventional 51-multiframe, all zeroes frequency correction burst (FCH), while network operator B transmits a 52-multiframe, alternating ones and zeroes frequency correction burst (PFCCH) in accordance with the teachings of this invention. In this regard the disclosure of the Appendix A of the above-referenced Provisional Patent Application No. 60/161,892, filed Oct. 27, 1999, is incorporated by reference herein in its entirety, as is the disclosure found in ETSI STC SMG2 EDGE Working Session #10, Bois D'Arcy, France, Aug. 24–27, 1999, Tdoc SMG2 EDGE 432/99.

The mobile station 10 typically includes a micro-control unit (MCU) 12 having an output coupled to an input of a display 14 and an input coupled to an output of a keyboard or keypad 16. The mobile station 10 may be considered to be a radiotelephone, such as a cellular telephone or a personal communicator, or a wireless packet data terminal. The MCU 12 is assumed to include or be coupled to some type of a read-only memory (ROM) 12A for storing an operating program, as well as a random access memory (RAM) 12B for temporarily storing required data, scratchpad memory, etc. A separate removable SIM 15 can be provided as well, the SIM storing, for example, a preferred PLMN list and other subscriber-related information.

Of particular interest to this invention, the mobile station 10 also includes a wireless section that includes a digital signal processor (DSP) 18, or equivalent high speed processor, as well as a wireless transceiver comprised of a transmitter 20 and a receiver 22, both of which are coupled to an antenna 24 for communication with the networks A and B. A local oscillator (LO) 19 receives a correction signal from the DSP 18, and the DSP 18 is coupled to a received signal level (RX-level) that is output from the receiver 22.

The DSP 18 is assumed to include or be coupled to a demodulator 18A and to further include a modified PSW search block 18B that is capable of detecting the presence of the conventional (nominal) 67.7 kHz pure sine wave (PSW) signal above the carrier frequency, as well a pure sine wave (PSW) signal that is about 67.7 kHz beneath or under the carrier frequency, in accordance with this invention. In practice, the signals of interest need not be pure sine waves.

Figure 2:
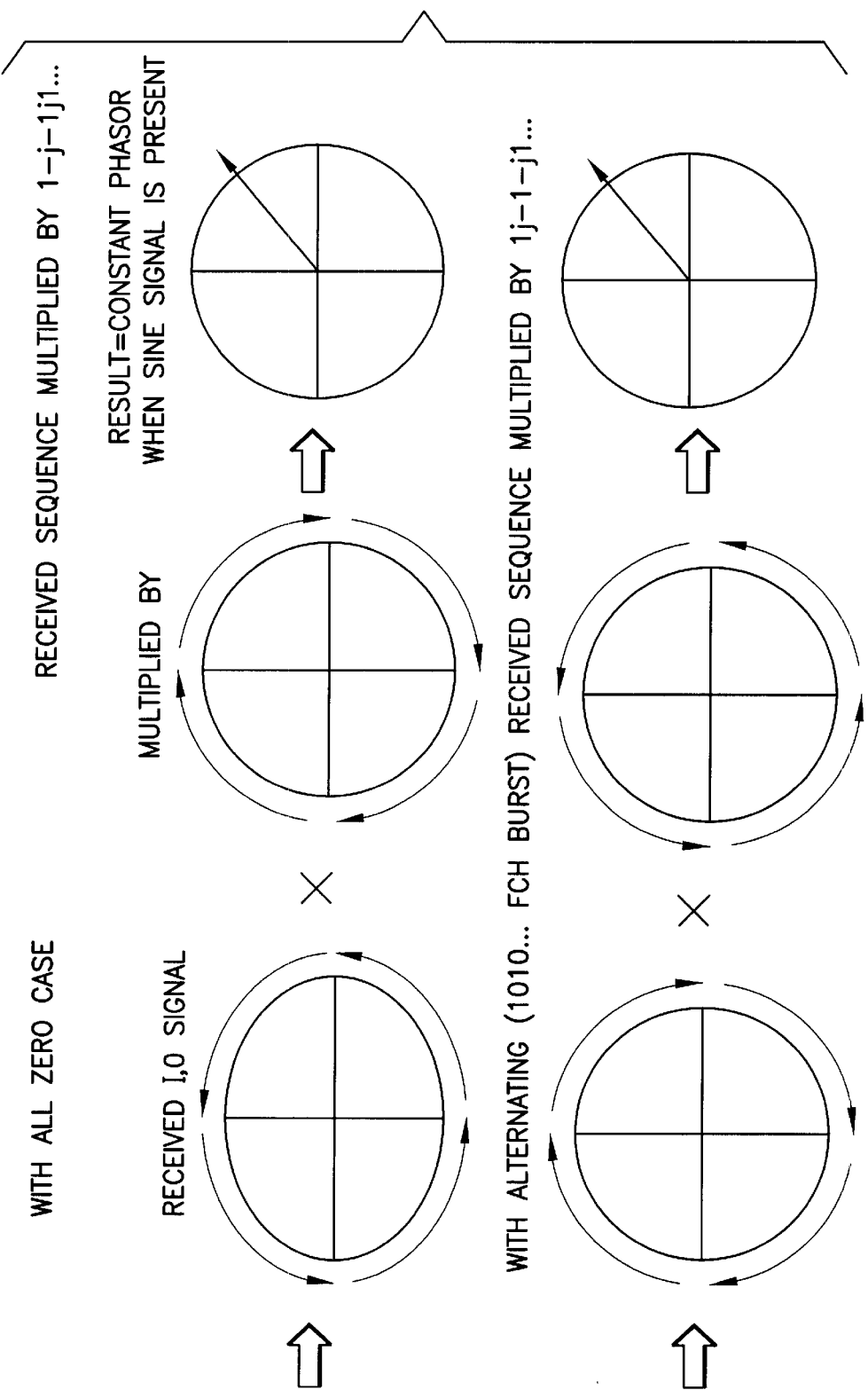
FIG. 2 is a diagram that illustrates the reception of an all zeroes symbol sequence and an alternating ones and zeros sequence.

FIG. 2 depicts the operation of the DSP 18 when receiving an Inphase/Quadrature (I/Q) pattern of all zeroes, and an I/Q pattern of alternating ones and zeroes. In the all zero case, the received I/Q sequence is multiplied in succession by 1–j, –1 j, 1–j, . . . , whereas in the alternating ones and zeroes case (which is GMSK modulated prior to transmission), the received I/Q sequence is multiplied in succession by 1 j, –1–j, 1 j, . . . , and it can be seen that the result is a constant phasor when the sine signal is present.

The presently preferred embodiment of the PSW searcher 18B enables demodulation of the +67.7 kHz and –67.7, kHz signals, and a continuous real time search for both of those signals to be performed preferably during the maximum RX-level search.

Figure 3:
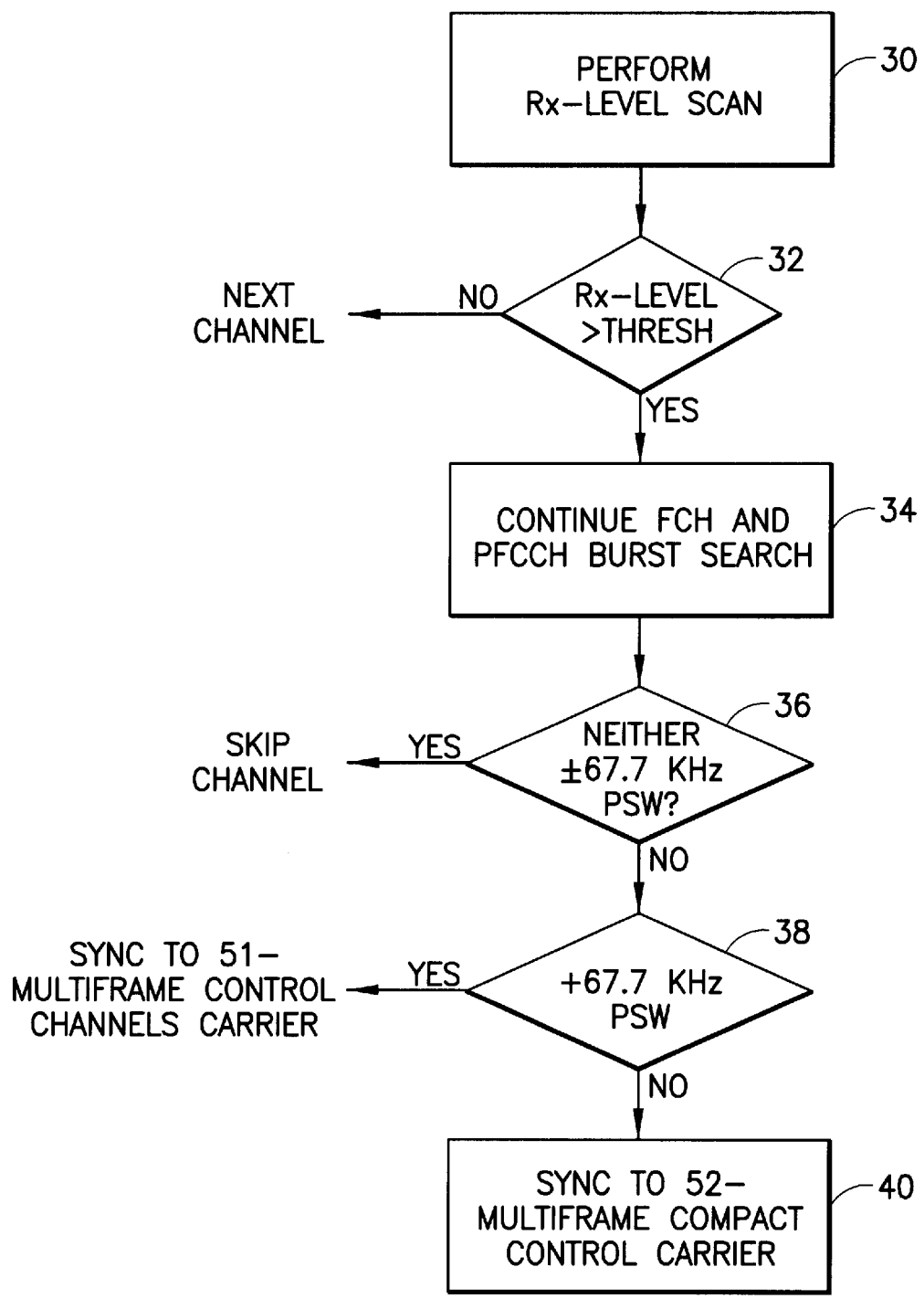
FIG. 3 is a logic flow diagram in accordance with an embodiment of this invention.

During the RX-level scan procedure the mobile station 10 is able to distinguish the control channels as follows (and decrease the initial cell selection time.) Reference is also made to the logic flow diagram of FIG. 3.

At Step 30 the RX-level scan is performed over a long enough period of time to receive at least one Compact control block. During the maximum RX-level search the PSW search for +67.7 kHz and –67.7 kHz sine waves is performed as well, and the results can be stored in the RAM 12B.

If the RX-level of the channel is above a threshold value (Step 32) then the FCH and PFCCH burst search is continued until the entire 52-multiframe is searched for that channel (Step 34).

At Step 36 a determination is made if the received signal strength level (RX-level) is high (above some threshold), and if neither the +67.7 kHz sine wave or the –67.7 kHz sine were found. If these conditions are found, then the current channel may be a pure traffic channel or some non-GSM carrier. In this case synchronization to this carrier is not attempted.

At Step 38, if the RX-level is high, and the +67.7 kHz sine was found, then the current channel is assumed to be a conventional 51-multiframe continuous GSM control channel. If the priority PLMN (which may be stored in the SIM 15) uses only the conventional (classic) 51-multiframe continuous GSM control channels, then synchronization to this carrier is attempted.

At Step 40, if the RX-level is high, and the –67.7 kHz sine was found, then the current channel is assumed to be a 52-multiframe discontinuous Compact control channel (a Packet Broadcast Control Channel (PBCCH) carrier.) If the priority PLMN uses the Compact control carriers, then synchronization to these carriers is attempted.

That is, the mobile station 10 is enabled to use the PSW search for +67.7 kHz and –67.7 kHz sine waves when attempting to synchronize to a preferred PLMN. This decreases the synchronization time, while essentially eliminating a possibility that the mobile station 10 will lock one to a wrong type of control channel. In that the "older" mobile stations (e.g., released before 1999) cannot detect the –67 kHz sine wave (the frequency offset is too large), then these mobile stations are not "confused" by the presence of modified PFCCH burst of alternating one and zeroes.

In practice, the frequency correction burst in accordance with these teachings contains leading and trailing tail bits and a number of fixed bits (as well as a guard period (bits)). In the most preferred embodiment there are three leading tail bits, all zeroes, followed by 142 fixed bits, which are alternating ones and zeroes, followed by three trailing tail bits, all zeroes. Several guard period (bits) then follow. Other arrangements of bits and bit lengths are also within the scope of these teachings.

While the invention has been particularly shown and described with respect to preferred embodiments thereof, it will be understood by those skilled in the art that changes in form and details may be made therein without departing from the scope and spirit of the invention.

What is claimed is:

1. A method to distinguish a first type of control channel from a second type of control channel, comprising steps of:
   transmitting a carrier of the first type of control channel so as to include a first symbol sequence that results, when demodulated, in a sine wave having a frequency with a first offset from the carrier;
   transmitting a carrier of the second type of control channel so as to include a second symbol sequence that results, when demodulated, in a sine wave having a frequency with a second offset from the carrier; and
   demodulating a received carrier and detecting whether the carrier includes the first type of control channel or the second type of control channel.

2. A method as in claim 1, wherein the first symbol sequence is an all zeroes sequence, and wherein the second symbol sequence is an alternating ones and zeroes sequence.

3. A method as in claim 1, wherein the first offset is a positive offset, and wherein the second offset is a negative offset.

4. A method as in claim 1, wherein the first offset is +67.7 kHz, and wherein the second offset is –67.7 kHz.

5. A method as in claim 1, wherein the step of demodulating includes a step of multiplying an I/Q representation of the received symbol sequence by 1–j, –1 j, 1–j, . . . , and by 1 j, –1–j, 1 j, . . .

6. A mobile station, comprising:
   a receiver for receiving a transmission from a network operator, the transmission including either a first type of control channel or a second type of control channel, where the first type of control channel is transmitted with a carrier and includes a first symbol sequence that results, when demodulated, in a signal having a frequency with a first offset from the carrier; and where the second type of control channel is transmitted with the carrier and includes a second symbol sequence that results, when demodulated, in a signal having a frequency with a second offset from the carrier; and
   a demodulator for demodulating a received carrier for use in detecting whether the carrier includes the first type of control channel or the second type of control channel.

7. A mobile station as in claim 6, wherein the first symbol sequence is an all zeroes sequence, and wherein the second symbol sequence is an alternating ones and zeroes sequence.

8. A mobile station as in claim 6, wherein the first offset is a positive offset, and wherein the second offset is a negative offset.

9. A mobile station as in claim 6, wherein the first offset is +67.7 kHz, and wherein the second offset is −67.7 kHz.

10. A mobile station as in claim 6, wherein said demodulator comprises a multiplier for multiplying an I/Q representation of the received symbol sequence by 1−j, −1 j, 1−j, . . . , and by 1 j, −1−j, 1 j, . . .

11. A method to distinguish a first type of control channel from a second type of control channel, comprising steps of:

modulating a carrier at a network operator site, the carrier being modulated to convey either the first type of control channel or the second type of control channel, where the first type of control channel includes a first symbol sequence that results, when demodulated, in a signal having a frequency with a first offset from the carrier and where the second type of control channel includes a second symbol sequence that results, when demodulated, in a signal having a frequency with a second offset from the carrier; and transmitting the modulated carrier from the network operator site.

12. A method as in claim 11, and further comprising steps of:

receiving the transmitted carrier at a mobile station;

demodulating the received carrier; and in response to a frequency offset of the demodulated carrier, detecting whether the received carrier was modulated to convey the first type of control channel or the second type of control channel.

13. A method as in claim 11, wherein the first symbol sequence is an all zeroes sequence, and wherein the second symbol sequence is an alternating ones and zeroes sequence.

14. A method as in claim 11, wherein the first offset is a positive offset, and wherein the second offset is a negative offset.

15. A method as in claim 11, wherein the first offset is +67.7 kHz, and wherein the second offset is −67.7 kHz.

16. A method as in claim 12, wherein the step of demodulating includes a step of multiplying an I/Q representation of a received symbol sequence by 1−j, −1 j, 1−j, . . . , and by 1 j, −1−j, 1 j, . . .

17. A method as in claim 11, wherein the step of transmitting transmits a frequency correction burst.

* * * * *